United States Patent
Yegoshin

(10) Patent No.: US 7,688,807 B2
(45) Date of Patent: Mar. 30, 2010

(54) METHOD AND APPARATUS FOR CREATING AND DISTRIBUTING COST TELEPHONY-SWITCHING FUNCTIONALITY WITHIN AN IP NETWORK

(75) Inventor: Leonid A. Yegoshin, Palo Alto, CA (US)

(73) Assignee: Genesys Telecommunications Laboratories, Inc., San Francisco, CA (US)

( * ) Notice: Subject to any disclaimer, the term of this patent is extended or adjusted under 35 U.S.C. 154(b) by 817 days.

(21) Appl. No.: 11/239,877

(22) Filed: Sep. 29, 2005

(65) Prior Publication Data

US 2006/0039362 A1 Feb. 23, 2006

Related U.S. Application Data

(63) Continuation of application No. 09/229,589, filed on Jan. 13, 1999, now abandoned.

(51) Int. Cl.
*H04L 12/66* (2006.01)
(52) U.S. Cl. .................. 370/352; 370/401; 709/238
(58) Field of Classification Search .............. None
See application file for complete search history.

(56) References Cited

U.S. PATENT DOCUMENTS

| | | | | |
|---|---|---|---|---|
| 5,940,479 | A * | 8/1999 | Guy et al. | 379/93.01 |
| 6,304,565 | B1 * | 10/2001 | Ramamurthy | 370/352 |
| 6,304,567 | B1 * | 10/2001 | Rosenberg | 370/356 |
| 6,434,114 | B1 * | 8/2002 | Jain et al. | 370/230 |

OTHER PUBLICATIONS

U.S. Appl. No. 09/229,589, Leniod Yegoshin.

* cited by examiner

*Primary Examiner*—Bob A Phunkulh
(74) *Attorney, Agent, or Firm*—Donald R. Boys; Central Coast Patent Agency, Inc.

(57) ABSTRACT

A system for providing and managing IP telephone calls establishes separate and distinct call legs between IP-capable appliances and routers and between routers, and creates calls, changes calls, and manages telephony functions by joining and disjoining calls legs. In some instances one or more call legs disjoined from an active call are maintained as established to be joined later to other call legs to create other active calls. By managing IP calls as separate and distinct legs functions of intelligent, connection-oriented telephony networks may be simulated in IP telephony systems. The management is provided by software running on processors coupled to routers in the IP network.

2 Claims, 3 Drawing Sheets

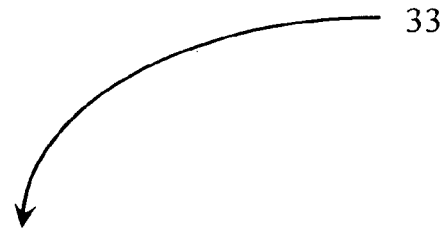

| Primitive | Description |
| --- | --- |
| SETUP | Create and set-up leg and call according to H323/ISDN voice protocol (include attributes of any existing legs) |
| Call Proceed | Send indication of responsibility for the call according to H323/ISDN voice protocol |
| Call Alert | Send indication of call-destination to target node according to H323/ISDN voice protocol |
| Call Connect | Establish voice communication (channels) over completed call-leg including end-node legs |
| Call Reject | Reject incoming leg if not available (send H323 reject message) |
| Call Release | Drop call-leg but maintain in established state of alert |
| Call Join | establish voice communication of dropped leg with another leg or legs at the site. |
| Call Disjoin | Break voice communication from one leg to other legs on site with option to maintain in established state |

Fig. 2

METHOD AND APPARATUS FOR CREATING AND DISTRIBUTING COST TELEPHONY-SWITCHING FUNCTIONALITY WITHIN AN IP NETWORK

The present application is a continuation application of patent application Ser. No. 09/229,589 entitled "Method and Apparatus for Creating and Distributing COST Telephony-Switching Functionality Within an IP Network", which was filed on Jan. 13, 1999 now abandoned, which is incorporated herein in its entirety by reference.

FIELD OF THE INVENTION

The present Invention is in the field of telephony communications and pertains more particularly to methods and apparatus for creating telephony switching type functionality on an Internet Protocol (IP) network in a distributive fashion.

BACKGROUND OF THE INVENTION

The field of telephony communication has undergone revolutionary improvement with the addition of computer integration by way of telephony-switch-connected digital processors running software applications designed to improve call processing and switching intelligence within a communication center and in some cases, within a communications network Such integration of telephony equipment and computer-processing equipment is known in the art as computer-telephony-integration (CTI), and is well known and widely available in various forms. Communications centers, as described above, are generally integrated with a connection-orientated-switched-telephony (COST) network such as a public-switch-telephone-network (PSTN) as is known in the art. In some cases, there are multiple centers interconnected via a wide-area-network WAN as known in the art.

In typical application, a communication center is enhanced with a CTI processor and software adapted to be connected to a communication-center COST switch, such as a PBX (central switch) within or local to the communication center for the purpose of improving intelligence to the COST switch by virtue of added software. In some embodiments known to the inventor, CTI capability is also added to telephony switches within a COST network such as to a service-control-point (SCP). CTI processors (network level and communication center processors) are connected together by a digital link so that certain CTI functions implemented at an SCP may be controlled from within a communication center (known to inventor). In this way intelligent routing, and other CTI functions may be initiated at network level and communication efficiency may be generally improved.

Data-network-telephony (DNT) communication has recently been developed for the purpose of allowing voice/video calls to be placed over a packet data network. A sub-set of DNT known as Internet-protocol-network-telephony (IPNT) is the most successful and widely implemented format practiced on data networks such as the well known Internet. Communication center capabilities have been further improved via implementation of local area network (LAN) capability, addition of communication equipment such as LAN-connected personal computer/video display units (PC/VDU's) with software to implement IP-telephony, and so on.

Agents or other users working in such a CTI-enhanced communication center, or in a large organization hosting multiple communications centers, no longer simply answer switch-connected telephones. Access to IP networks have enabled communication centers and multi-center sites to utilize PC/VDU's and other digital apparatus to send and receive e-mails and voice calls/messages in data-network-telephony (DNT) format.

Communication centers have more recently incorporated IPNT technologies into their COST infrastructure. Hence, IP calls as they are termed in the art, may be placed and received in much the same way as COST calls. In a typical scenario, data-router gateways (nodes) are set-up in an IP network for point-to-point connection between nodes. Nodes local to communications centers are connected to telephony switches (usually a PBX) at respective communication centers. Typically, such IP technology only replaces switch-to-switch telephony trunking in this scenario.

In true IP telephony, as known to the inventor, traditional COST switches at communications centers are replaced by IP-capable switches. Cost functions, such as some PBX features, are emulated at IP switches by incorporating CTI software to provide intelligent network (IN) functionality. A problem with this approach, however, is that some PBX functions cannot be economically practiced with IP telephony. For example, if an IP call is placed from one site to a second site, and the user at the second site is having his calls forwarded to a third party at the fist site, then the call must travel two times across the link. This is due to current art requirements in DNT for setting up each instance of connection from source to final destination each time a connection is needed. Because IP telephony uses shared bandwidth as opposed to having a COST dedicated connection, capacity is wasted with multiple channel establishment, and quality of service (QoS) associated with IP calls over the connection may be degraded if there are many such calls. This is true in a COST integrated IP network, as well as in an IN (true IP).

What is clearly needed is a method and apparatus that will emulate PBX, or other standard COST-switch functions and features on an IP network, including connected communication centers, with minimal degradation of QoS or using up otherwise available resources.

SUMMARY OF THE INVENTION

In a preferred embodiment of the present invention a system for simulating connection-oriented telephony functions in an IP network is provided, comprising two or more IP routers interconnected with two or more call appliances on a network; and software managing setup and execution of IP calls between call appliances through the routers. In the system IP calls are managed by the software by setting up separate and distinct end-node call legs between call appliances and routers, and separate and distinct intermediate call legs between routers, and then joining legs to establish voice communication and to provide telephony functions.

In some embodiments of the system call appliances include Interactive Voice Response (IVR) units, and the system establishes end-node legs between IVRs and IP routers. Also in some embodiments, in providing telephony functions, call legs once established and joined may be disjoined and maintained in established state for future use to be rejoined to other established call legs. The software executes directly on one or more IP routers connected to the network, or on one or more processors enhancing IP routers on the network. In some cases there is at least local area network (LAN) connecting end appliances at one or more of the IP routers, and wherein end-node legs are established via the LAN to appliances on the LAN.

In another aspect of the invention a method for simulating connection-oriented telephony functions in an IP network is provided, comprising steps of (a) interconnecting two or more IP routers with two or more call appliances on a network; (b) setting up separate and distinct end-node call legs between call appliances and routers, and separate and distinct intermediate call legs between routers; and (c) joining and disjoining legs to provide telephony functions.

In the method call appliances may include Interactive Voice Response (IVR) units, and the system establishes end-node legs between IVRs and IP routers. The method may also include steps for disjoining call legs of completed calls and maintaining one or more disjoined legs in established state for future use to be rejoined to other established call legs in providing telephony functions. In preferred embodiments the software executes directly on one or more IP routers connected to the network, or on one or more processors enhancing IP routers on the network. There may also be at least one local area network (LAN) connecting end appliances at one or more of the IP routers, and a step for establishing end-node legs via the LAN to appliances on the LAN.

In yet another aspect of the invention a method for establishing an IP telephone call from a first IP-capable appliance through first and second IP routers to a second IP-capable appliance, comprising steps of (a) setting up a separate and distinct end-node call leg between the first appliance and the first router; (b) setting up a separate and distinct end-node call leg between the second appliance and the second router; (c) setting up at least one separate and distinct intermediate call leg between the first and second IP routers; and (d) joining the call legs to establish voice communication.

This method for establishing a call may further comprise additional interconnected routers and appliances, and may include steps for setting up further call legs to additional appliances and between routers, and for joining and disjoining call legs to establish voice communication by different paths over established call legs. Some call legs are maintained after being disjoined from active calls to be used later to be joined to other call legs to create other active calls. There may further be Interactive Voice Response (IVR) units, and call legs may be established to IVRs.

In embodiments of the invention, by setting up separate and distinct call legs between routers and appliances, and then joining and disjoining the legs to establish and discontinue voice communication, legs can be joined and disjoined to provide different active calls and to provide intelligent call functions not before available in IP-telephony.

BRIEF DESCRIPTION OF THE DRAWING FIGURES

FIG. 2 is a table illustrating several IP/PBX primitives, which may be emulated in the system of FIG. 1 according to an embodiment of the present invention.

DESCRIPTION OF THE PREFERRED EMBODIMENTS

According to a preferred embodiment of the present invention, a method and apparatus is provided and adapted to emulate and distribute COST switching functions within an IP network without use of COST switches, and wherein Intelligent Network capability is enhanced.

Figure 1:
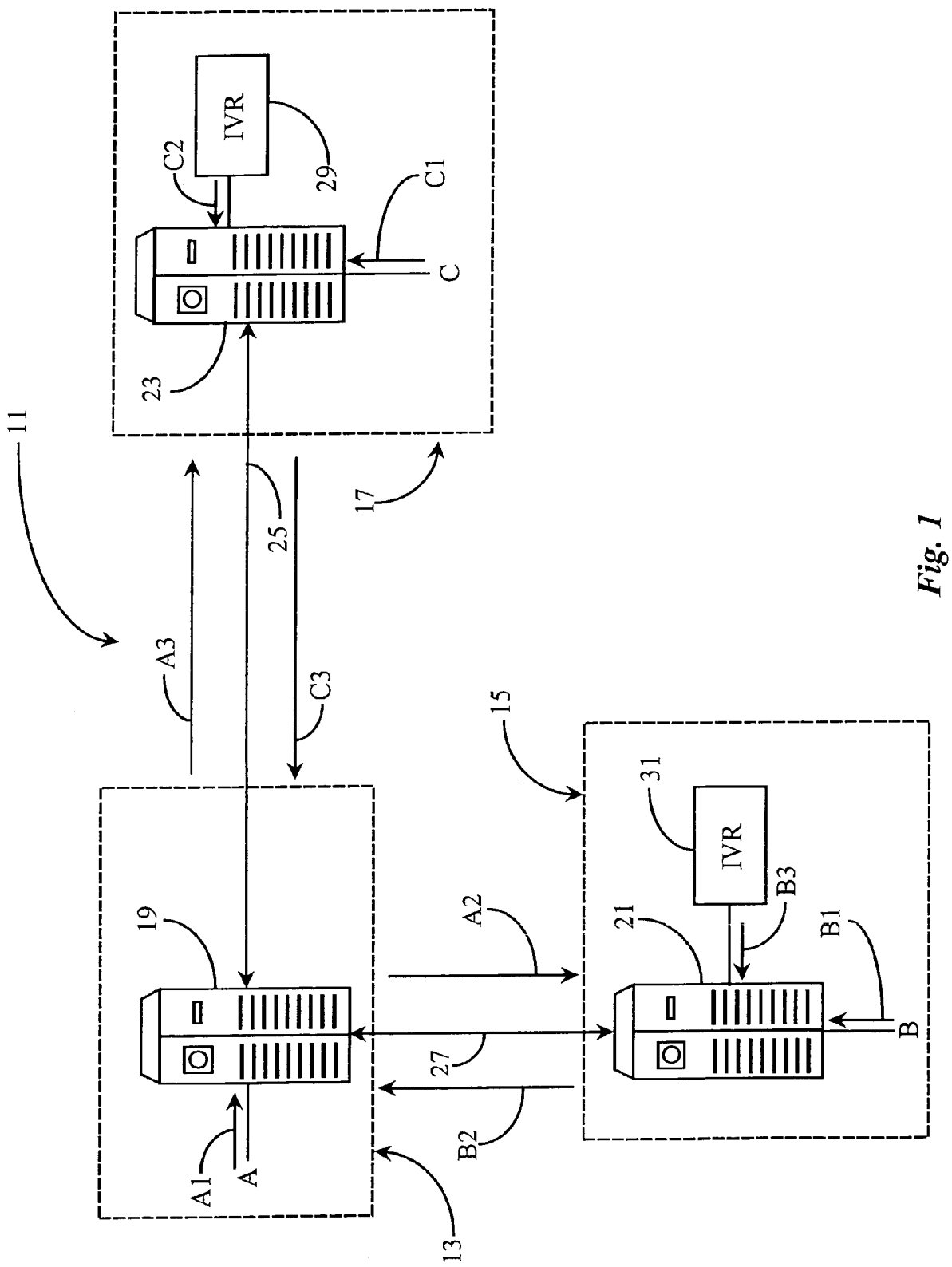
FIG. 1 is an overview of an IP communication system emulating a PBX primitive according to an embodiment of the present invention.

FIG. 1 is an overview of an IP communications system 11 emulating a PBX functionality according to an embodiment of the present invention. IP communications-system 11 comprises in this example three connected communications sites 13, 15, and 17. IP system 11 may, in some embodiments, be integrated with a COST network such as a PSTN network or a private COST network (COST equipment not shown). In other embodiments, IP system 11 may be a company-hosted IP network such as a corporate wide-area-network (WAN) linked to the Internet. There are many possible and variant architectures that may be implemented with respect to an IP network such as network 11.

Communications sites 13, 15, and 17 may, in one embodiment, be communications centers. In another embodiment, such sites may be communication-network hubs linking multiple communication centers or call-in sites. IP switches 19, 21 and 23 are implemented one each at respective communication site 13, 15, and 17. IP switch 19 within site 13 is linked to IP switch 21 within site 15 via a data-network connection 27. IP switch 19 is also connected to IP switch 23 within site 17 via a data-network connection 25. Data-network connections 27 and 25 are, in this embodiment, integrated-service-digital-network (ISDN) connections. However, other known types of connections may be used provided that at least one voice-communication protocol of the family of network protocols known as Transfer-Control-Protocol/Internet-Protocol (TCP/IP) is observed. One such protocol enabling voice communication is H323 IP protocol.

In this example a COST function (call-waiting) is described and emulated in system 11 without using COST switching apparatus. Furthermore, set-up and execution of the call-waiting feature is performed in a manner that requires fewer resource than would otherwise be required in an IP environment.

Referring again to FIG. 1, a user A associated with site 13 and having an IP-capable telephone or other IP-call-capable appliance connected to the network is engaged in an established call with a user B, also having a capable phone appliance, associated with site 15. For purposes of the descriptions herein, it is to be understood that IP calls made by a user or an end-site are made using IP-capable equipment, such as a PC/VDU or an IP-phone or appliance, although it may not be explicitly stated in all instances. An IP-capable appliance is considered the most generic term, including IP-capable telephones, PCs, IP-capable cell phones, organizers, and the like; that is, any device capable of supporting an IP telephone call.

In the art, such a call is established from one user's equipment directly to the other, as the directing influence will be the IP address of the called party. In the present invention, however, separate legs are established, identified, and separately maintained, for reasons that will quickly become apparent. The separate and unique call legs are set up and manipulated by CTI applications running either on the IP routers (such as router 19), or on CTI servers connected to and enhancing the IP routers. In some cases address translation in the IP routers/switches is used, but other, equivalent strategies are gateways, gatekeepers etc, all either well known or recently introduced into.

There are four call-legs that enable this working connection through network 11 in this example. An end-node leg A1 is established between user A and switch 19 and is illustrated by arrow A1. An intermediate call-leg A2 is established between switch 19 within site 13 and switch 21 within site 15. Leg A2 is illustrated by arrow A2. These two legs, A1 and A2 represent one half of a working connection. The other half of the working connection comprises an end-node leg B1 that is established between user B and switch 21 (directional arrow B1), and an intermediate leg B2 which is established between switch 21 and switch 19 (directional arrow B2). This working connection allows two-way voice communication using, in this instance, H323 voice protocol over the ISDN connection.

During the time of the established voice call between user A and user B, a user C associated with site 17 places a call to user A. In a conventional system the call would simply be rejected. In this example an !VR 29 is provided, and the call is queued in IVR 29 associated with switch 23 as is consistent with a call-waiting feature. Redirection is accomplished by CTI applications running on the IP routers or CTI processors associated with the IP routers, using address translation techniques. To illustrate serial active steps performed to affect completion of this example, consider the following.

An end-node leg C1 is first established between user C and switch 23 (directional arrow C1). Because user A is currently unavailable, and the intelligence associated with IP router 23 discerns this fact through a control signal to router 19, a second end-node leg C2 is established between IVR 29 and switch 23 (directional arrow C2). End-node leg C2 has attributes of leg C1 for the purpose of call identification and association such as QoS, billing responsibility, and other required information used to associate the two legs. End-node legs C1 and C2 are then joined resulting in IVR parking of the call from user C. An intermediate call-leg C3 is then established between switch 23 in site 17 and switch 19 in site 13 and maintained in established state in anticipation of call connection. Hence, one-half of a working connection is set up and a call alert is sent to switch 19 over connection 25, to user A over working end-node leg A1. User A is now notified of an impending call from user C by an agreed alert. In an alternative embodiment call notification may be sent from switch 23 to switch 19 and user A over end-node leg A1 without establishing intermediate leg C3 if a separate (non-voice) control channel is used for such alerting.

At a request from user A, who decides to accept the incoming waiting call from user C, an end-node leg B3 is established between an IVR 31 at site 15 to switch 21 (arrow B3). This set up includes attributes of end-node leg B1 such as QoS, billing responsibility, and other required information used to associate the two legs. After a connection is established by joining legs B1 and B3, (user B queued at IVR 31), legs B2 and A2 (intermediate legs) are disjoined from active voice communication, but are maintained in an established state in anticipation of returning to the call from user B (holding).

User A may now pick-up the call from user C as follows. An intermediate leg A3 is set-up between switch 19 in site 13 and switch 23 in site 17 over network connection 25 (arrow A3). Leg A3 contains attributes of leg A1 for call-association purposes as described above. Leg A1 and A3 are joined by a function of the associated intelligence at the routers. End-node leg C1 is now joined to intermediate leg C3 according to H323 voice protocol. End-node leg C2 is then deleted because it is no longer required.

In this example, user A has exercised through unique system capability a call-waiting feature which is a standard COST feature. By manipulating the call legs in an ordered fashion specific to each type of COST-switch-feature emulated, the IP call does not have to travel as far over the tie-line. More simply, by disjoining call legs but remanding them in an established state, re-set procedures inherent to prior-art IP networks may be avoided. Therefore, the network may handle more calls using fewer resources, and the calls may be established and routed more quickly than normal. The inventor has discovered that virtually any COST switching feature can be made available to IP network 11 through the manipulation of call legs. Also, the exact order of call-leg manipulation will depend largely upon the feature emulated used. The example provided above is exemplary of just one such possibility. Several call primitives suggested for emulation of COST functionality are described more fully below.

FIG. 2 is a table 33 illustrating IP/PBX call primitives, which may be emulated in network 11 of FIG. 1 according to an embodiment of the present invention. Table 33 illustrates several primitives or commands that may be assembled to provide a feature such as call-waiting, call consult, call conferencing, and so on. Table 33 assumes that H323 voice protocol and ISDN connections are used. However, other protocols and connections may be used in other embodiments as previously described.

Table 33 has two columnns. A left column under the heading Primitive lists each primitive by name. A second column under the heading Description describes the functions of each primitive listed in the first column. Organization of table 33 is such that the description of a primitive is located immediately to the right of the primitive described. For example, the first-listed entry SETUP involves creating call legs according to existing protocol, in this example, H323 voice communication over ISDN connection. Attributes of any existing legs to be joined are also included such as QoS and resource-reservation-protocol (RSVP), caller ID, call destination, and so on.

Working down from SET-UP, Call Proceed involves sending indication of and responsibility of a call. Call Alert involves sending indication of call destination to a target end-node. Call Alert may, in some embodiments, be executed without setting up a completed half of a working connection such as by exerting command control through an IP back-channel or control channel. Call Connect establishes voice communication over completed call architecture (all involved call-legs). Call Reject covers non-acceptance of an incoming call by rejecting establishment of an incoming call-leg. Call Release drops a call-leg but maintains it in an established state in anticipation of returning to the call. Call Join establishes voice communication between call legs such as with a dropped leg and an existing leg. Call attributes are used to associate legs as described above. Call Disjoin breaks voice communication between call legs with an option to maintain them in established state.

Table 33 as illustrated herein is meant to be exemplary only. It will be apparent to one with skill in the art that additional call primitives not listed may be included therein without departing from the spirit and scope of the present invention. Organization and manipulation of individual call legs to emulate features and send commands is provided via CTI enhancement modules executed on IP switch-connected processors, or within the IP switch itself. More detail regarding CTI management architecture is provided below.

Figure 3:
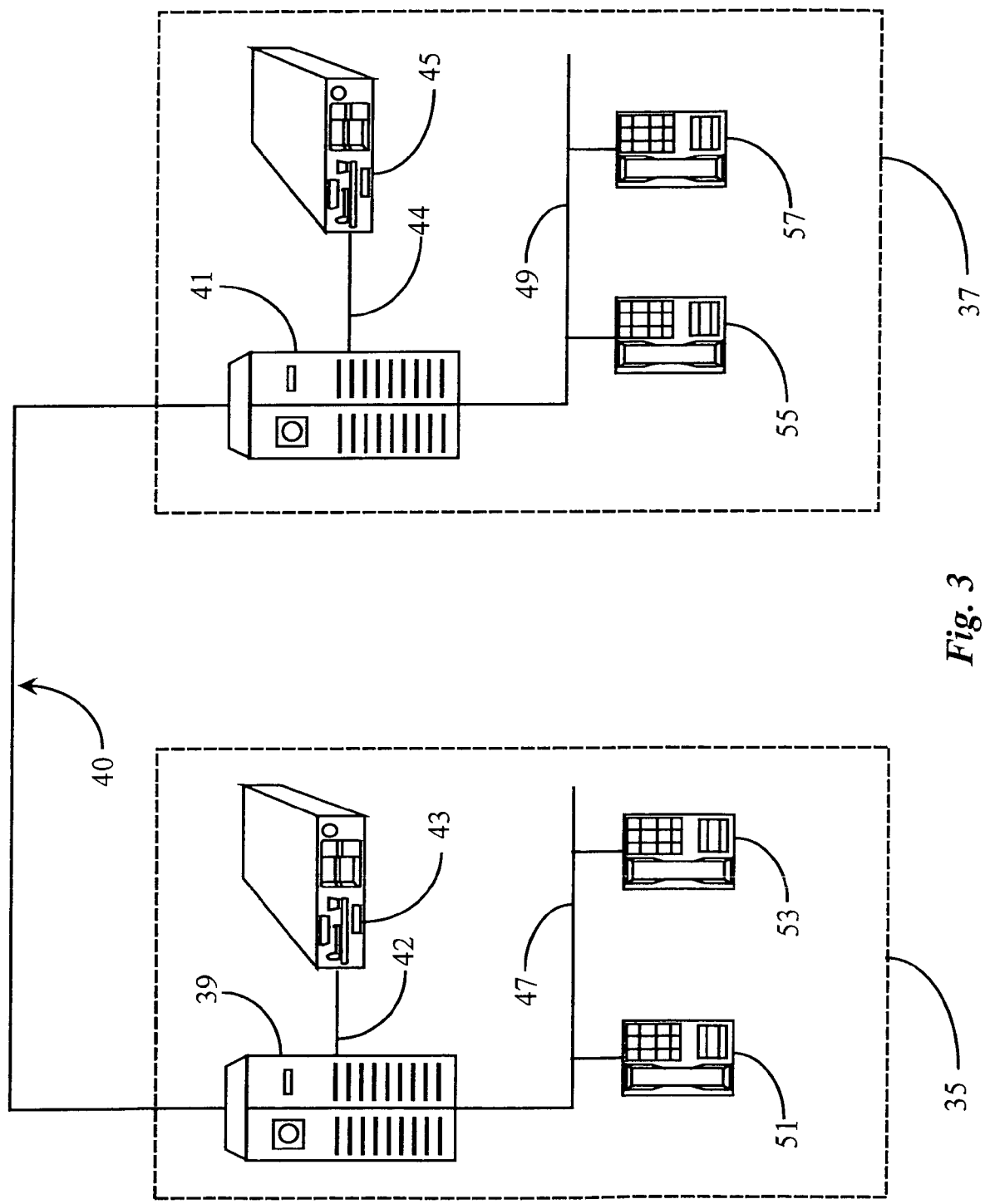
FIG. 3 is a block diagram illustrating a CTI management link to an IP network according to an embodiment of the present invention.

FIG. 3 is a block diagram illustrating a CTI management link to an IP network according to an embodiment of the present invention. In this embodiment, two communications sites 35, and 37 are represented. Sites 35 and 37 are analogous to sites 13-17 of FIG. 1 and are shown here as communications centers. Hereafter, the term communications center will be used to describe site 35 and site 37.

Communication center 35 comprises an IP switch 39, a local-area-network (LAN) 47, and LAN-connected DNT capable telephones 51 and 53. A CTI processor 43 is provided and adapted to provide monitoring and control services to switch 39 via a CTI link 42. Communication center 37 comprises an IP switch 41, a LAN 49, and LAN-connected DNT telephones 55, and 57. A CTI processor 45 is adapted to provide monitoring and control services to switch 41 via a CTI link 44.

Communications centers 35 and 37 are connected to each other by an IP network link 40. In some embodiments, network link 40 may include PSTN network integration as well as integration with other IP networks. Communication centers 35 and 37 are not required to have identical communications equipment or connection apparatus. The fact that they are identical in this embodiment is only a convenience for description. The only requirement is that they are connected to the CTI processing capability according to an embodiment of the present invention.

The software used to manipulate the call legs as in FIG. 1 and to send commands between centers 35 and 37 is implemented on each connected processor 43 and 45. In another embodiment, software capability may be incorporated within each switch 39 and 41 without requiring separate connected processors such as processors 43 and 45. Communication and control routines are routed through network link 40 with IP communication using a voice channel, and other data using a control channel. Overall cooperation between separate IP sites is assured through usually continuous communication between the function intelligences at the various connected sites.

This example illustrates the simple nature of CTI enhancement to switches 39 and 41. Intermediate call-legs as previously described with reference to FIG. 1 above are set up over network link 40. End-node legs are set up between switches and end-nodes over respective LAN's. For example, an end-node leg may be established between switch 39 and DNT phone 51, switch 39 and DNT phone 53 or other connected devices that are capable of IP communications such as PC/VDU's (not shown). As previously described, virtually any COST switching function may be emulated on network link 40.

It will be apparent to one with skill in the art that any number of varying network architectures may be implemented as network 40 without departing from the spirit and scope of the present invention. For example, communication sites may be in fact communication centers that are interconnected via an IP network wherein each communication center maintains an IP switch and CTI processor. In another embodiment, IP switches may represent communication hubs distributed thoroughout an IP network with communication centers linked locally to each switch. Distributed PBX functionality in an IP network may also include integration with other networks both IP and COST. There are many such possibilities.

It will further be apparent to one with skill in the art that COST emulation software running on IP/CTI processors may include or be integrated with routing and other control routines normally implemented in such processors. The present invention should be afforded the broadest of scope. The spirit and scope of the present invention is limited only by the claims that follow.

What is claimed is:

1. A system for simulating connection-oriented telephony functions in an Internet Protocol (IP) network, comprising:

a first IP router in the network coupled to a first Internet-capable call appliance and to a second IP router;

a second Internet-capable call appliance coupled to the second IP router; and software executing from a digital storage medium, the software enabled to control specific functions of the first and second IP router;

a call waiting server connected to the second IP router;

wherein a first call placed from the first Internet-capable call appliance is connected to the second Internet-capable call appliance managed by the software creating and joining separate and distinct intermediate call legs between the first call appliance, the first IP router, the second IP router and the second Internet-capable call appliance and a second call placed to the second Internet-capable call appliance, when the second Internet-capable call appliance is in use with the first call, is redirected from the second IP router to the call-waiting server by the software creating a distinct and separate call leg for the second call from the second IP router to the call-waiting server, the call-waiting server and the IP router cooperate to provide an indication at the second Internet-capable call appliance that there is a call waiting and upon completion of the first call, the end node call leg associated with the first call to the second Internet-capable call appliance is destroyed, and a new end node call leg is established from the second IP router to the second Internet-capable call appliance, the new leg associated with the second call, thereby completing the second call to the second Internet-capable call appliance.

2. An Internet protocol (IP) router for managing IP telephone calls, comprising:

an IP network connection to a first Internet-capable call appliance and an IP connection to a call waiting server; and software executing from a digital medium; and a call waiting server connected to the IP router wherein a first call placed from the first Internet-capable call appliance to the second Internet-capable call appliance is managed by the software at the IP router to terminate a first end node call leg between the first Internet-capable call appliance and the IP router, and to establish a separate and distinct intermediate call leg associated with the call, the intermediate call leg established and terminated between the IP router and the second Internet-capable call appliance and a second call is placed to the second Internet-capable call appliance, when the second Internet-capable call appliance is in use with the first call, the second call redirected from the IP router to the call-waiting server creating a distinct and separate call leg for the second call from the IP router to the call-waiting server, the call-waiting server and the IP router cooperate to provide an indication at the second Internet-capable call appliance that there is a call waiting and upon completion of the first call, the end node call leg associated with the first call to the second Internet-capable call appliance is destroyed, and a new end node call leg is established from the IP router to the second Internet-capable call appliance, the new leg associated with the second call, thereby completing the second call to the second Internet-capable call appliance.

* * * * *